C. L. BETTS.
VEHICLE LAMP.
APPLICATION FILED NOV. 11, 1910.

1,018,030.

Patented Feb. 20, 1912.
2 SHEETS—SHEET 1.

Witnesses:

Inventor:
Charles L. Betts,
By Wilhelm, Parker & Hand,
Attorneys.

C. L. BETTS.
VEHICLE LAMP.
APPLICATION FILED NOV. 11, 1910.

1,018,030.

Patented Feb. 20, 1912.
2 SHEETS—SHEET 2.

Witnesses:
C. H. Bund.
A. G. Dimond.

Inventor,
Charles L. Betts,
By Wilhelm, Parker & Hard,
Attorneys.

UNITED STATES PATENT OFFICE.

CHARLES L. BETTS, OF NEW YORK, N. Y., ASSIGNOR TO R. E. DIETZ COMPANY, OF NEW YORK, N. Y.

VEHICLE-LAMP.

1,018,030.  Specification of Letters Patent.  Patented Feb. 20, 1912.

Application filed November 11, 1910. Serial No. 591,799.

*To all whom it may concern:*

Be it known that I, CHARLES L. BETTS, a citizen of the United States, residing at New York, borough of Brooklyn, in the county of Kings and State of New York, have invented a new and useful Improvement in Vehicle-Lamps, of which the following is a specification.

This invention relates to that class of lamps for use on vehicles and other purposes in which the oil pot is detachably secured in the lower portion of the lamp body, which latter is provided with an opening into which the oil pot is inserted from below, and has particular reference to such lamps in which the oil pot is attached to the body by interlocking lugs, which are engaged by a rotary movement of the oil pot and lamp body with reference to each other, and in which the oil pot is secured in the locked position by a spring catch.

The object of the invention is to provide a simple, durable, cheap and convenient oil pot fastening for this class of lamps.

Figure 1:
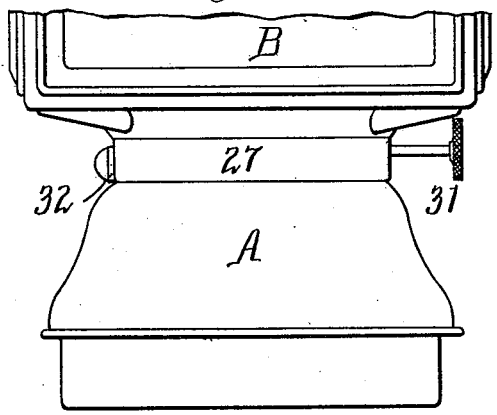
Figure 2:
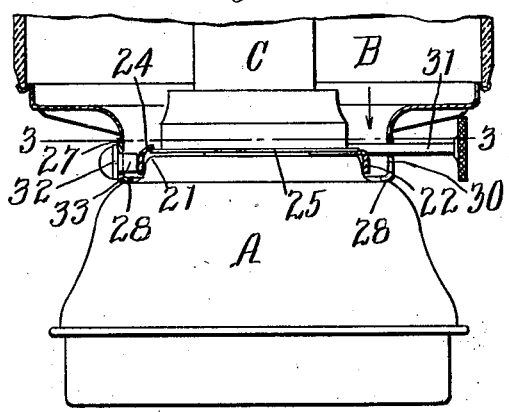
Figure 3:
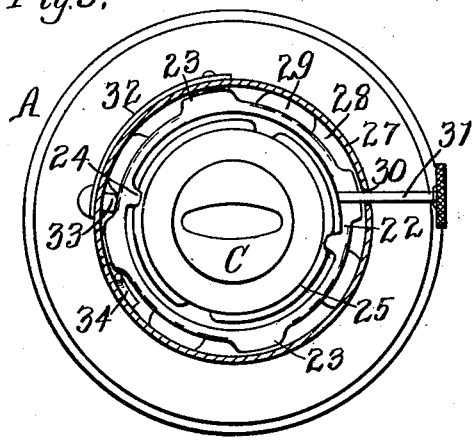
Figure 4:
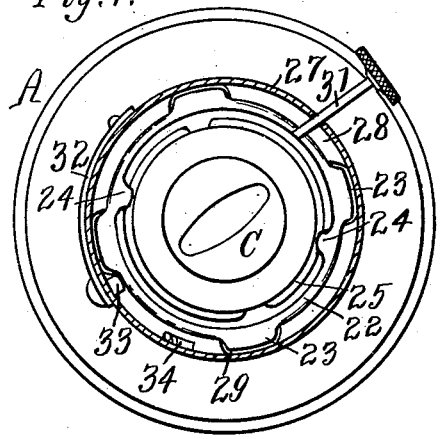
Figure 5:
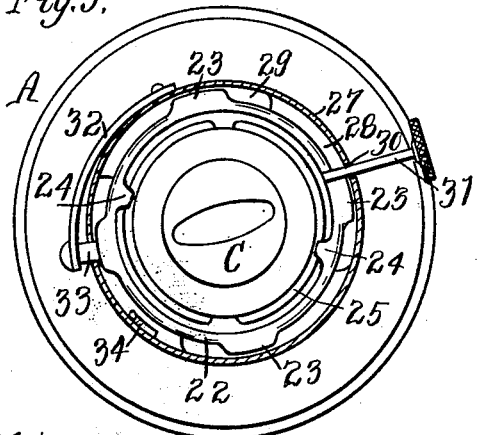
Figure 6:
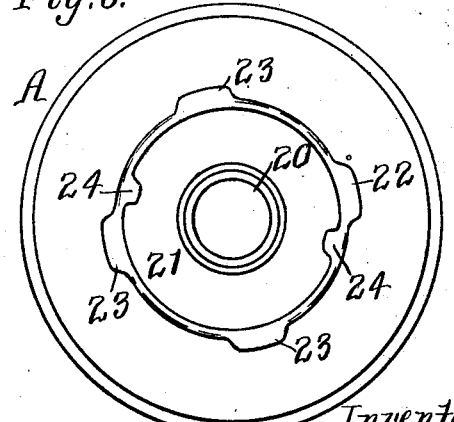
Figure 7:
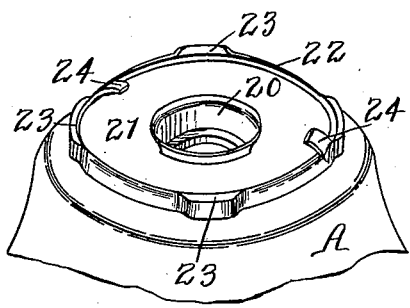
Figure 8:
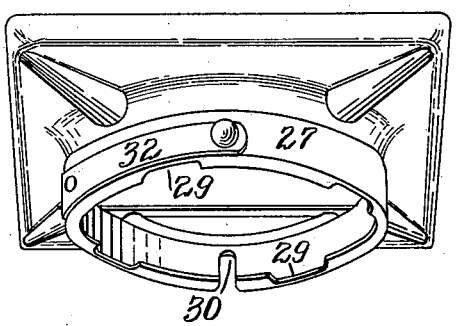
Figure 9:
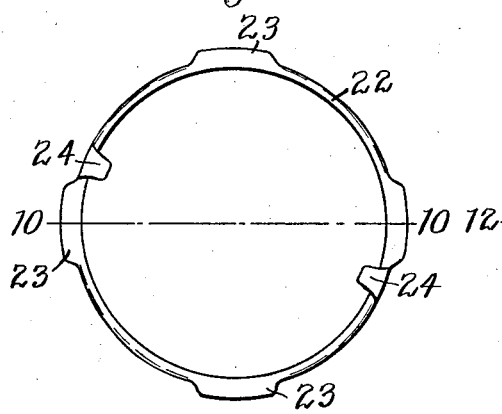
Figure 11:
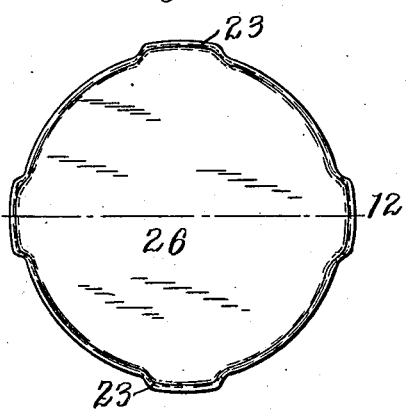
Figure 10:
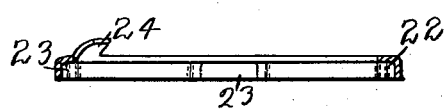
Figure 12:
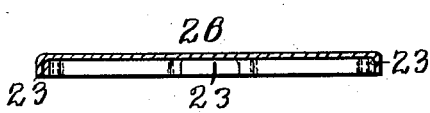

In the accompanying drawings, consisting of two sheets: Figure 1 is a side elevation of the lower portion of a vehicle lamp embodying this invention. Fig. 2 is a sectional elevation of the same. Fig. 3 is a horizontal section on line 3—3, Fig. 2, showing the oil pot in the locked position. Fig. 4 is a fragmentary horizontal section on the same line, showing the oil pot unlocked. Fig. 5 is a view similar to Fig. 4, showing the oil pot in an intermediate position. Fig. 6 is a top plan view of the oil pot detached. Fig. 7 is a perspective view of the upper portion of the oil pot. Fig. 8 is a perspective view of the lower portion of the lamp body. Fig. 9 is a detached plan view of the attaching ring of the oil pot. Fig. 10 is a vertical section on line 10—10, Fig. 9. Fig. 11 is a plan view of the stamped disk from which the ring is formed. Fig. 12 is a vertical section on line 12—12, Fig. 11.

Like reference characters refer to like parts in the several figures.

A represents the oil pot having its top provided with the usual burner socket 20 and with an upright annular shoulder 21 concentric with said socket.

22 represents the attaching ring of the oil pot which is secured upon the top thereof around the annular shoulder 21 and provided on its outer side with overhanging attaching lugs 23, preferably four in number, as shown. This ring may be further provided with upwardly and inwardly projecting attaching lips 24 for the burner C, which latter engages with the base flange 25 of the cone underneath these lugs, if this means of securing the burner in the socket is employed. Other means of securing the burner may, however, be employed, if desired. The attaching lugs 23 are formed integrally with the ring 22 by stamping the latter from a flanged disk 26 which is provided with the lugs 23, as represented in Figs. 11 and 12, and afterward cutting out the inner portion of this disk, the latter being stamped from a flat blank of suitable sheet metal, such as sheet brass. This attaching ring is secured to the top of the oil pot around the shoulder 21 thereof by soldering or other suitable means.

The lamp body B has at its bottom an attaching collar 27 which is provided at its lower end with an inwardly projecting flange 28 having openings 29 which permit the lugs 23 of the attaching ring to pass upwardly to a position above the flange, in which position the lugs can be engaged over the flange by a rotary movement of the oil pot and lamp body with reference to each other. The attaching collar 27 is provided with a notch 30 for the wick raiser shaft 31 of the burner.

32 represents the spring catch which is secured to the outer side of the attaching collar 27 and provided at its free end with a locking head, bolt or projection 33 which projects inwardly through an opening in the collar in such a position as to engage the adjacent lug of the attaching ring of the oil pot.

34 represents a stop or shoulder formed on the inner side of the attaching collar in such a position that in the locked position of the oil pot, represented in Fig. 3, the locking head of the spring catch and the stop 34 bear against opposite ends of the adjacent locking lug 23.

Upon inserting the oil pot with its attaching ring into the attaching collar of the lamp body, the lugs 23 pass through the openings 29 of the collar, and the locking head of the spring catch stands adjacent to one of the attaching lugs, as represented in Fig. 4. Upon turning the oil pot or the lamp body in the locking direction the lugs engage over the flange 28, and the lug adjacent to the locking head of the spring catch presses the latter outwardly, the lugs being rounded or beveled at their ends for that purpose. During the further rotation the locking head bears against the outer side of the lug, as represented in Fig. 5, until the lug has passed by the locking head, when the latter is projected inwardly by the spring and takes its position against one end of the lug, while the opposite end of the lug strikes against the stop 34, Fig. 3, which stop prevents further rotation in the locking direction. In this position of the parts the spring catch and the stop hold the oil pot against rotation in either direction.

The ends of the locking lugs are preferably rounded or inclined to such an extent that they are sufficiently abrupt to hold the oil pot securely against accidental movement out of the locked position, and at the same time permit the lugs to force the spring catch out of the way upon applying sufficient force in the proper direction, thereby enabling the oil pot to be secured or released simply by a turning movement of the oil pot or lamp body with reference to each other and without requiring the spring catch to be manipulated for the purpose.

The attaching ring stiffens the top of the oil pot, forms a rigid support for the attaching lugs and secures the latter to the oil pot in a simple, strong and efficient manner. As the lugs are formed integrally with the ring they are properly spaced in each lamp, so that the oil pots and bodies are interchangeable, and are maintained in the correct position while the lamp is in use.

I claim as my invention:

1. The combination with an oil pot having an attaching ring secured thereto and provided with outwardly-projecting attaching lugs, of a lamp body having a flanged attaching collar provided with openings for the passage of said lugs, a spring catch secured to said collar, projecting into the same and engaging one end of one of said lugs, and a stop in said collar engaging the opposite end of said lug, substantially as set forth.

2. The combination with an oil pot having an attaching ring secured thereto which is provided with outwardly projecting attaching lugs, of a lamp body having at its lower end an attaching collar comprising an inwardly projecting flange which is provided with openings registering with said lugs and permitting the passage of said lugs above said flange, said lugs being engaged with said flange by a rotary relative movement of the oil pot and lamp body, and a spring catch secured to the outer side of said attaching collar and having a head which penetrates said collar above its flange and is arranged on the outer side of said ring and engages one of the attaching lugs on said ring, substantially as set forth.

3. The combination with an oil pot, of an attaching ring secured thereto and provided with outwardly-projecting lugs adapted to engage the lamp body and inwardly-projecting lips adapted to engage the burner, substantially as set forth.

Witness my hand in the presence of two subscribing witnesses.

CHARLES L. BETTS.

Witnesses:
 FRED H. TWOMBLY,
 ROBERT A. CURRIE.

Copies of this patent may be obtained for five cents each, by addressing the "Commissioner of Patents, Washington, D. C."